L. A. ASPINWALL.
CONVEYER.
APPLICATION FILED OCT. 28, 1919.
1,408,969.
Patented Mar. 7, 1922.
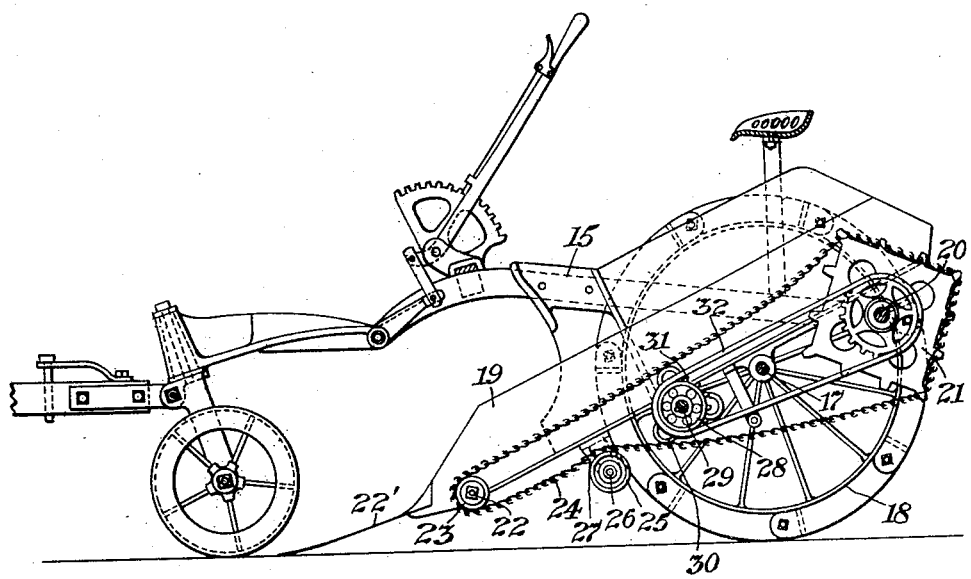
Fig. 1
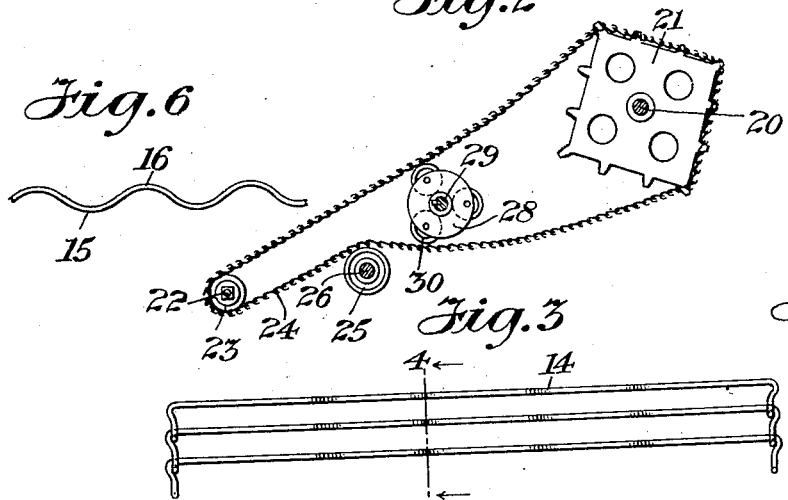
Fig. 2
Fig. 6
Fig. 3
Fig. 4
Fig. 5
INVENTOR
Lewis Augustus Aspinwall
BY
HIS ATTORNEYS

UNITED STATES PATENT OFFICE.

LEWIS AUGUSTUS ASPINWALL, OF JACKSON, MICHIGAN, ASSIGNOR TO ASPINWALL MFG. CO., A CORPORATION OF MICHIGAN.

CONVEYER.

1,408,969.

Specification of Letters Patent.   Patented Mar. 7, 1922.

Application filed October 28, 1919. Serial No. 333,875.

*To all whom it may concern:*

Be it known that I, LEWIS AUGUSTUS ASPINWALL, a citizen of the United States, residing at Jackson, in the county of Jackson and State of Michigan, have invented an Improvement in Conveyers, of which the following is a specification.

This invention relates to a conveyer and more particularly to an endless conveyer as employed in a potato digger or other similar apparatus. In the potato digger as shown and described in my copending application, Serial No. 274,875, together with a frame and a plow, there is associated an endless conveyer upon which the earth and potatoes are delivered from and by the plow so as to be raised and delivered at a place of deposit, and means for agitating the conveyer so that during the travel of the potatoes, the earth is shaken loose therefrom so as not to be deposited therewith, and it is to this particular form of endless conveyer that the present invention more particularly relates. In such a conveyer, as will be apparent, it is desirable to so construct the conveyer as to present an irregular surface to the mass of earth containing the potatoes as it is delivered from the plow to the conveyer, and the object of course is to break up the earth so as to more effectually separate the same from the potatoes by the agitating action of the conveyer. In constructing such a conveyer, and as is also shown in my aforesaid application, I employ a plurality of rods formed with sockets and links for connecting one rod to the next adjacent rod, and also provided with corrugations which are placed at right angles preferably to the conveyer longitudinally thereof, or in other words, placed at right angles to the direction in which the conveyer travels so that in passing over the rollers adjacent the plow, the earth as delivered from the plow to the conveyer will be directly engaged by these corrugated portions of the conveyer rods to assist in the breaking up of the earth.

In the drawings:—

Fig. 1 is a longitudinal cross section and partial elevation of a potato digger in which my improved form of conveyer is employed.

Fig. 2 is an elevation illustrating the manner in which the conveyer is mounted.

Fig. 3 is a plan of a portion of the conveyer made in accordance with my invention.

Fig. 4 is a section taken on line 4—4, Fig. 3.

Fig. 5 is a perspective view illustrating a portion of the conveyer, and

Fig. 6 is an elevation of a part of a conveyer rod taken at right angles to the position as illustrated in Fig. 3.

By reference to the drawing, it will be seen that in carrying out this invention and in constructing the endless conveyer in accordance therewith, I employ a plurality of rods, each of which is indicated at 10. At the respective ends of each rod, the same is provided with an out-turned member so that a socket 11 is formed, and a loop or hook 12 provided at the extremities of the rods. Intermediate of the ends of each rod and in suitable positions, the same is curved or provided with a series of corrugations indicated at 13. The hooks at the ends of each rod are adapted to engage the sockets in the next adjacent rod to form the conveyer and thus complete the same, and the corrugations 13 are so placed therein as to lie at right angles to the direction of travel of the conveyer and at right angles longitudinally of the conveyer so that the outer projections 14 of the corrugations extend outwardly and the inner projections 15 of the corrugations extend inwardly.

In the digger in which this conveyer is adapted for use, there is a frame 16 in which is mounted a shaft 17, upon which the traction wheels 18 are secured. Connected to the frame 16 is an inner or conveyer frame 19, and in the conveyer frame there is suitably journaled a shaft 20 upon which are mounted sprockets 21. These sprockets as illustrated are preferably square in outline although they may be of other configurations in order to agitate the conveyer to the required extent to separate the earth from the potatoes. Also in the conveyer frame, there are mounted stub shafts 22, on which there are rollers 23. A conveyer 24 made from the corrugated rods and hooked ends, as hereinbefore described, passes over the sprockets 21 and the rollers 23, being driven from the shafts 20 through the sprockets 21, it being understood that the rollers 23 are so placed in the lower end of the conveyer frame as to be adjacent the inner or delivery end of a plow 22' so that the earth and potatoes as taken from the ground or potato hills are delivered from the plow upon the conveyer, and that in so doing, the outer corrugations 14 present projections which penetrate the earth and in so doing, assist in breaking the same from the potatoes also to assist the agitating devices in removing the earth from the potatoes. Another advantage also derived from the use of the corrugated rods, is to prevent the earth from sliding laterally when digging upon hillsides. The corrugations lock or retain the earth, while straight rods allow it to slide to one side of the machine, and thus prevent complete separation. Furthermore, as illustrated in Fig. 1, I may employ idler pulleys 25 mounted on a shaft 26 which is journaled in brackets 27 suitably secured to the conveyer frame and over which the conveyer passes in order to properly support the under or inoperative portion of the conveyer during the travel thereof.

Furthermore as shown in Fig. 1, I may also employ auxiliary agitating devices comprising disks 28 mounted on a shaft 29 which is journaled in the conveyer frame, and upon which disks there are secured a series of spaced rollers 30 adapted in the revolution of the disks to successively strike the upper or operative portion of the conveyer to agitate the same in addition to the agitation produced by the square or rectangular sprockets 21. On the shaft 29, there is also a gear 31 on which a chain 32 passes, this chain 32 also passing over a gear 33 on the shaft 20 so that the shaft 29 and the parts associated therewith for additionally agitating the conveyer are driven from the shaft 20.

I claim as my invention:—

1. A conveyer comprising a plurality of rods each corrugated in a plane transverse to the direction of the travel of the conveyer with the corrugations extending on both sides of the axis of the rod for the purpose of presenting relatively sharp corrugations to disintegrate the earth and separate the same from the potatoes, and also to provide pockets for the reception of the potatoes during the elevation of the same by the conveyer.

2. A conveyer comprising a plurality of rods each linked at its ends to the next adjacent rod with each rod corrugated in a plane transverse to the direction of the travel of the conveyer with the corrugations extending on both sides of the axis of the rod for the purpose of presenting relatively sharp corrugations to disintegrate the earth and separate the same from the potatoes, and also to provide pockets for the reception of the potatoes during the elevation of the same by the conveyer.

3. A conveyer comprising a plurality of rods, each linked at its ends to the next adjacent rod and corrugated in a plane transverse to the direction of the travel of the conveyer with alternate corrugations extending above and below the axis of the rod for the purpose of presenting relatively sharp corrugations to disintegrate the earth and separate the same from the potatoes, and also to provide pockets for the reception of the potatoes during the elevation of the same by the conveyer.

4. An endless conveyer comprising a plurality of rods each having sockets and hooks at the ends thereof adapted to engage and thus be connected to the next adjacent rod, with each rod corrugated in a plane transverse to the direction of the travel of the conveyer and the corrugations extending alternately above and below the axis of the rod for the purpose of presenting relatively sharp corrugations to disintegrate the earth and separate the same from the potatoes, and also to provide pockets for the reception of the potatoes during the elevation of the same by the conveyer.

5. In a potato digger, a frame, an endless conveyer mounted to travel in the frame and comprising a plurality of rods, each rod being corrugated in a plane transverse to the direction of the travel of the conveyer and the corrugations extended alternately above and below the axis of the rod, caused to provide therein projections which are presented to the earth as the same and the potatoes are delivered to the conveyer to separate the earth from the potatoes and also to provide pockets between the inclined members of the corrugations for the reception of the potatoes while being elevated by the conveyer.

6. In a potato digger, a frame, an endless conveyer, and means for mounting the endless conveyer and moving the same in the said frame, the said conveyer comprising a plurality of rods, each having sockets and hooks at the ends thereof for engaging the corresponding parts of the next adjacent rod, and each also being corrugated in a plane transverse to the direction of travel of the conveyer with the corrugations extending alternately above and below the axis of the rod caused to present projections to the earth as the same and the potatoes are delivered to the conveyer to separate the earth from the potatoes and also to provide pockets between the inclined members of the corrugations for the reception of the potatoes while being elevated by the conveyer.

Signed by me this 24th day of October, 1919.

LEWIS AUGUSTUS ASPINWALL.

Witnesses:
C. G. ROWLEY,
GEO. N. WHITNEY.